(12) United States Patent
Anderson et al.

(10) Patent No.: US 6,260,804 B1
(45) Date of Patent: Jul. 17, 2001

(54) FUNCTIONALLY AND STRUCTURALLY MODULAR PARALLELOGRAM-SHAPED SPACECRAFT

(75) Inventors: Thomas W. Anderson, Cupertino; F. M. Bay, Sunnyvale; John Bonham, San Jose, all of CA (US)

(73) Assignee: Lockheed Martin Missiles & Space, Sunnyvale, CA (US)

( * ) Notice: Subject to any disclaimer, the term of this patent is extended or adjusted under 35 U.S.C. 154(b) by 0 days.

(21) Appl. No.: 09/262,003

(22) Filed: Mar. 4, 1999

(51) Int. Cl.[7] .................................................. B64G 1/22
(52) U.S. Cl. ...................... 244/158 R; 244/159; 244/172; 244/173
(58) Field of Search .............................. 244/158 R, 173, 244/172, 159

(56) References Cited

U.S. PATENT DOCUMENTS

| | | |
|---|---|---|
| 4,057,207 | 11/1977 | Hogan . |
| 4,384,692 * | 5/1983 | Preukschat . |
| 4,395,004 | 7/1983 | Ganssle et al. . |
| 4,684,084 * | 8/1987 | Fuldner et al. . |
| 4,880,187 | 11/1989 | Rourke et al. . |
| 4,896,848 * | 1/1990 | Ballard et al. . |
| 5,014,936 * | 5/1991 | Nauck . |
| 5,242,135 * | 9/1993 | Scott . |
| 5,324,146 * | 6/1994 | Parenti et al. . |
| 5,372,183 * | 12/1994 | Strickberger . |
| 5,372,340 | 12/1994 | Ihara et al. . |
| 5,407,152 | 4/1995 | Pelischek et al. . |
| 5,522,569 | 6/1996 | Steffy et al. . |
| 5,779,195 | 7/1998 | Basuthakur et al. . |
| 5,806,799 | 9/1998 | Lounge . |
| 5,806,800 * | 9/1998 | Caplin . |
| 5,927,654 * | 7/1999 | Foley et al. . |

* cited by examiner

Primary Examiner—Peter M. Poon
Assistant Examiner—Tien Dinh
(74) Attorney, Agent, or Firm—Swidler Berlin Shereff Friedman, LLP

(57) ABSTRACT

A functionally and structurally modular, parallelogram-shaped spacecraft. The spacecraft includes a plurality of modules joined to one another along an axis of the spacecraft, wherein each module is devoted to a particular function of the spacecraft, and wherein all of the modules have the same cross-sectional size and geometry. The geometry is approximately a parallelogram in a plane normal to the axis of the spacecraft. The functions include power, processing, propulsion, and the like.

9 Claims, 13 Drawing Sheets

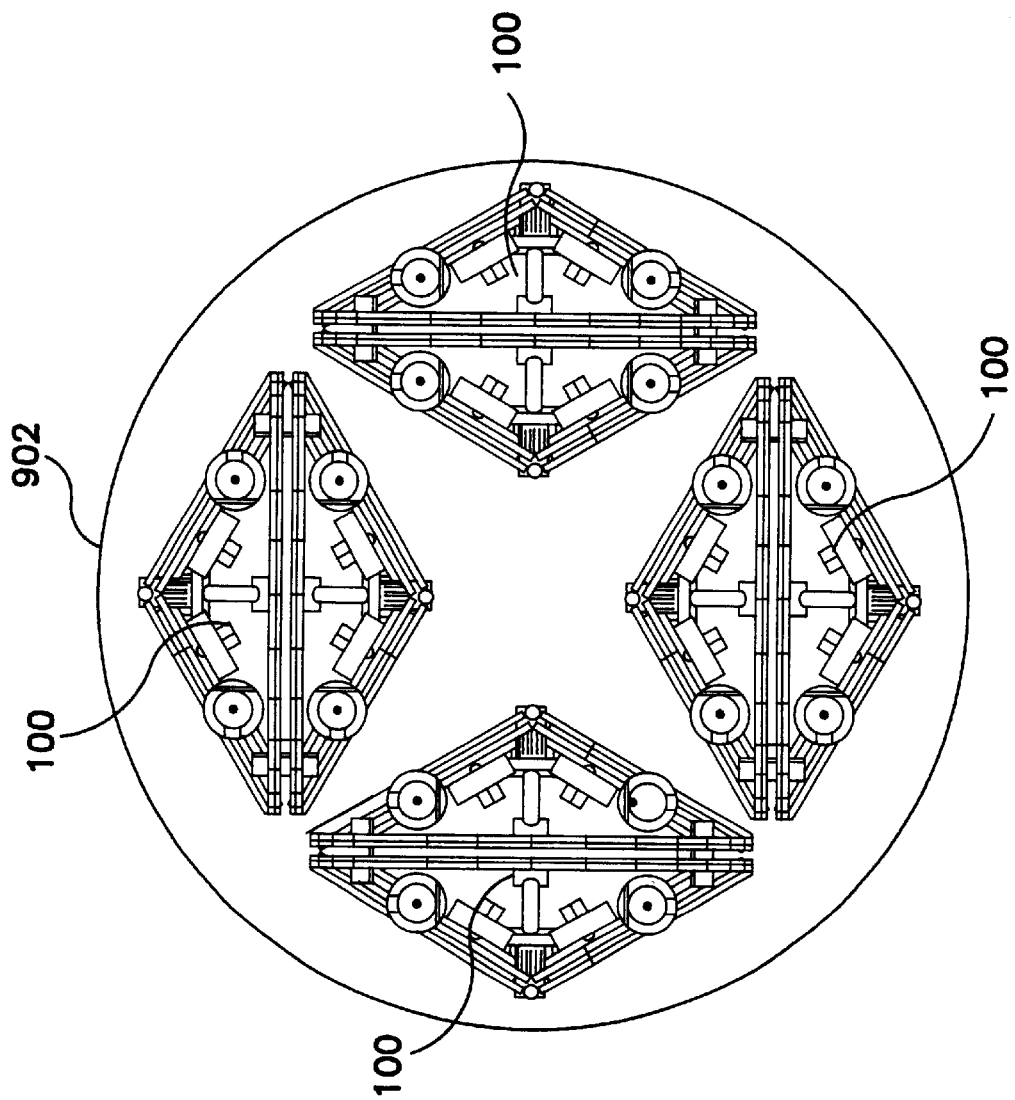
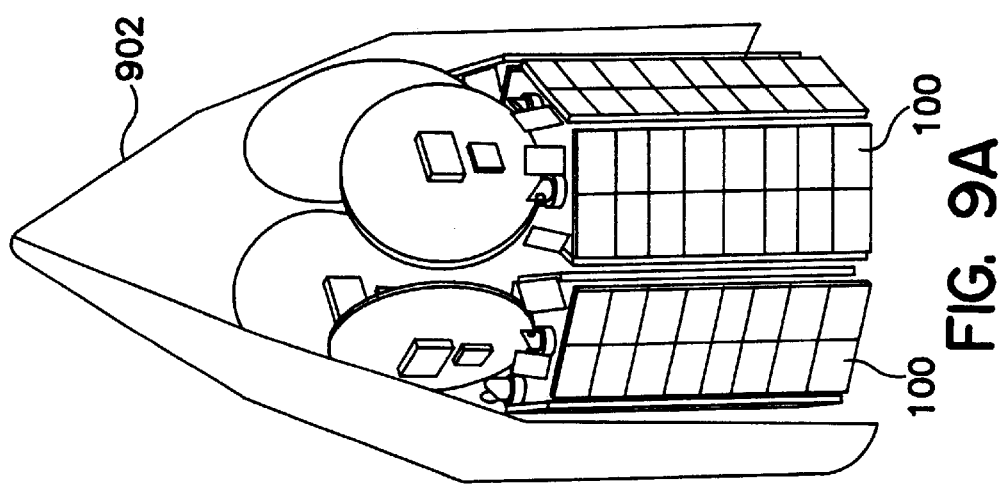

FUNCTIONALLY AND STRUCTURALLY MODULAR PARALLELOGRAM-SHAPED SPACECRAFT

BACKGROUND OF THE INVENTION

1. Field of the Invention

The present invention relates generally to the manufacture and deployment of orbital spacecraft, and more particularly to the manufacture of spacecraft using functional modules and the deployment of such spacecraft using conventional launch vehicles.

2. Related Art

The deployment of orbital spacecraft incurs substantial costs. One source of these costs arises from the nonrecurring costs of designing, developing and manufacturing entirely new spacecraft for each new mission. To alleviate these costs, manufacturers have turned to the use of standard spacecraft busses. A spacecraft bus includes all of the subsystems required to support a payload. Common bus subsystems include those for electrical power, attitude knowledge and control, communication, propulsion, thermal management, onboard processing, and structure. Under this approach, a single spacecraft bus can support a variety of mission payloads without substantial nonrecurring bus-related costs for each mission.

Such monolithic spacecraft busses are generally manufactured in a centralized process resembling an automobile assembly line. One disadvantage of this approach is that it features a single critical path. If a problem occurs with any bus on the assembly line, the line must be halted until the problem is corrected. During this halt, most of the manufacturing equipment and personnel are forced to remain idle.

Another disadvantage of this centralized approach is that it is a slow one. One solution conventionally employed is to simply replicate the assembly line so that multiple assembly lines can be operated simultaneously. Of course, each individual assembly line is prone to the problem described above. Another flaw in this solution is that the replication of assembly lines requires duplication of manufacturing equipment and staffing of additional personnel, thereby multiplying the cost of the manufacturing process.

Another significant cost arises from the use of launch vehicles to deploy spacecraft in orbit. The prevailing trend is to launch spacecraft using expendable launch vehicles such as the Atlas, Proton, and Delta II rockets. The spacecraft are mounted inside the fairing at the top of the vehicle for transport to orbit. During the ascent phase of the launch, or after reaching the desired orbit, the spacecraft are deployed.

One way to minimize the per-spacecraft launch cost is to maximize the number of spacecraft that can be mounted within a launch vehicle fairing. Some efforts have concentrated on optimizing the cross-sectional size and shape of the spacecraft to fit a particular fairing. Unfortunately, conventional cross sections that are optimized for a particular launch vehicle are not well-suited for other launch vehicles.

SUMMARY OF THE INVENTION

The present invention is a functionally and structurally modular, parallelogram-shaped spacecraft. The spacecraft includes a plurality of modules joined to one another along an axis of the spacecraft, wherein each module is devoted to a particular function of the spacecraft, and wherein all of the modules have the same cross-sectional size and geometry. The geometry is approximately a parallelogram in a plane normal to the axis of the spacecraft. The functions include power, processing, propulsion, and the like.

According to one aspect of the invention, an internal angle of the parallelogram is approximately sixty degrees and an edge of the parallelogram is approximately 33 inches.

According to another aspect of the invention, each corner of the parallelogram includes a mounting surface.

According to another aspect of the invention, a plurality of longitudinal members are each coupled to one of the mounting surfaces of each module, at least one of the members is formed into a channel, thereby improving the structural stiffness of the spacecraft and providing an interconnection path between the modules.

According to another aspect of the invention, a plurality of clips are coupled between the structural panels of adjacent modules.

According to another aspect of the invention, the spacecraft includes a solar array foldable into a plurality of sections, each of the sections positionable against a side of the spacecraft corresponding to a side of the parallelogram.

According to another aspect of the invention, the spacecraft includes a mission antenna foldable into a plurality of sections, each of the sections positionable against a side of the spacecraft corresponding to a side of the parallelogram.

One advantage of the present invention is that functional modules can be added to a spacecraft or removed from a spacecraft with ease.

Another advantage of the present invention is that the functional modules can be assembled in different arrangements based on mission considerations.

Yet another key advantage of the present invention is that it permits parallel and distributed manufacturing.

Another advantage is that it is easy to reconfigure a manufacturing facility to make different types of spacecraft for different missions by retaining the manufacturing lines for modules that are common to the new spacecraft, such as propulsion and power, while merely adding new lines for new modules that are required by the mission, such as a new payload module.

Another advantage of the present invention is that its unique cross-sectional shape permits a large number of spacecraft to be mounted in each of the commercially-available launch vehicle fairings.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

FIGS. 7–10 (A–B) show a spacecraft stowed and mounted within several commercially-available launch vehicles according to a preferred embodiment of the present invention.

DETAILED DESCRIPTION OF THE PREFERRED EMBODIMENTS

The present invention is described in terms of the above example. This is for convenience only and is not intended to limit the application of the present invention. In fact, after reading the following description, it will be apparent to one skilled in the relevant art how to implement the present invention in alternative embodiments.

Figure 1:
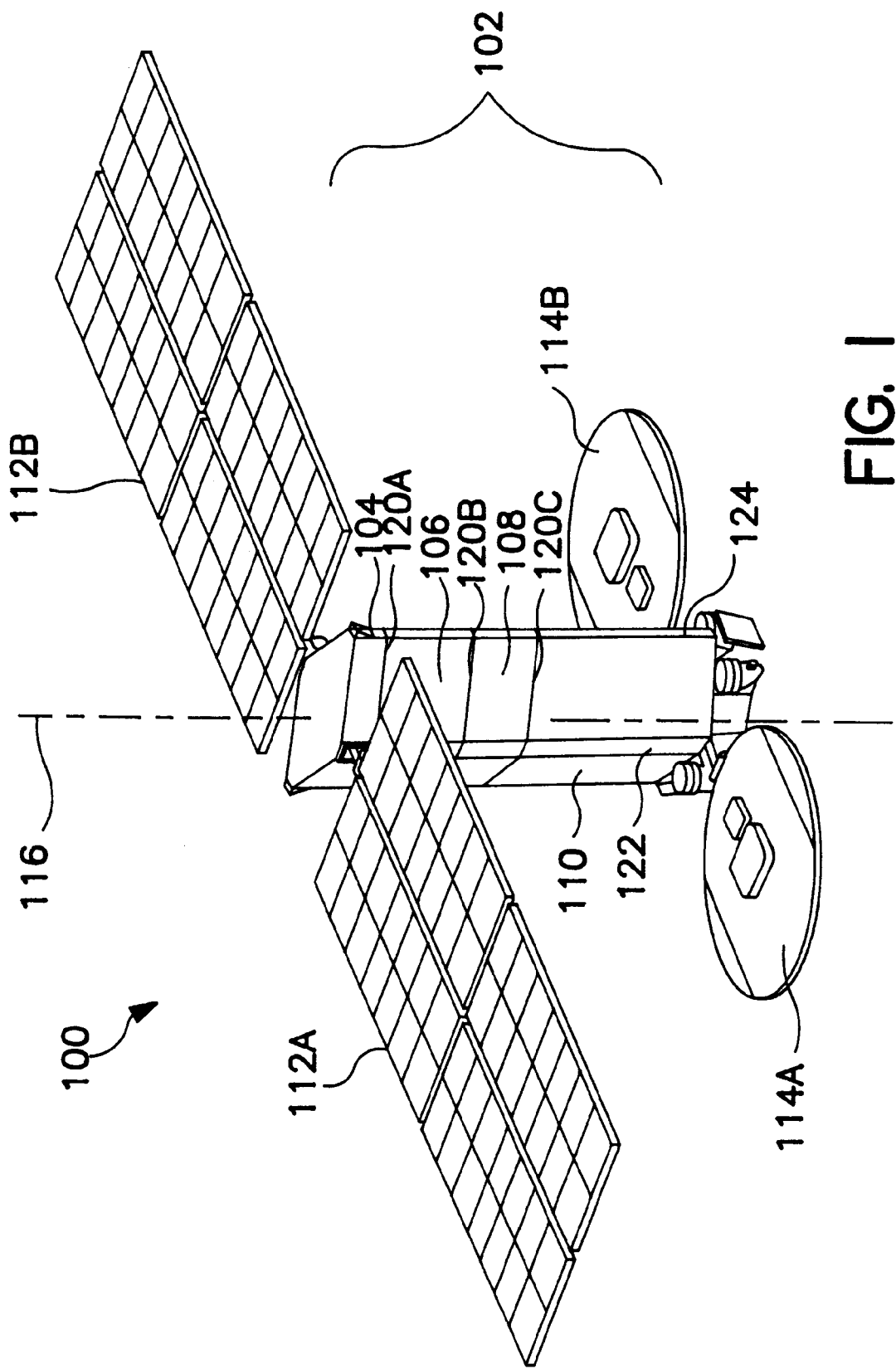
FIG. 1 is a perspective view of a spacecraft in an on-orbit configuration according to a preferred embodiment of the present invention.
Figure 2:
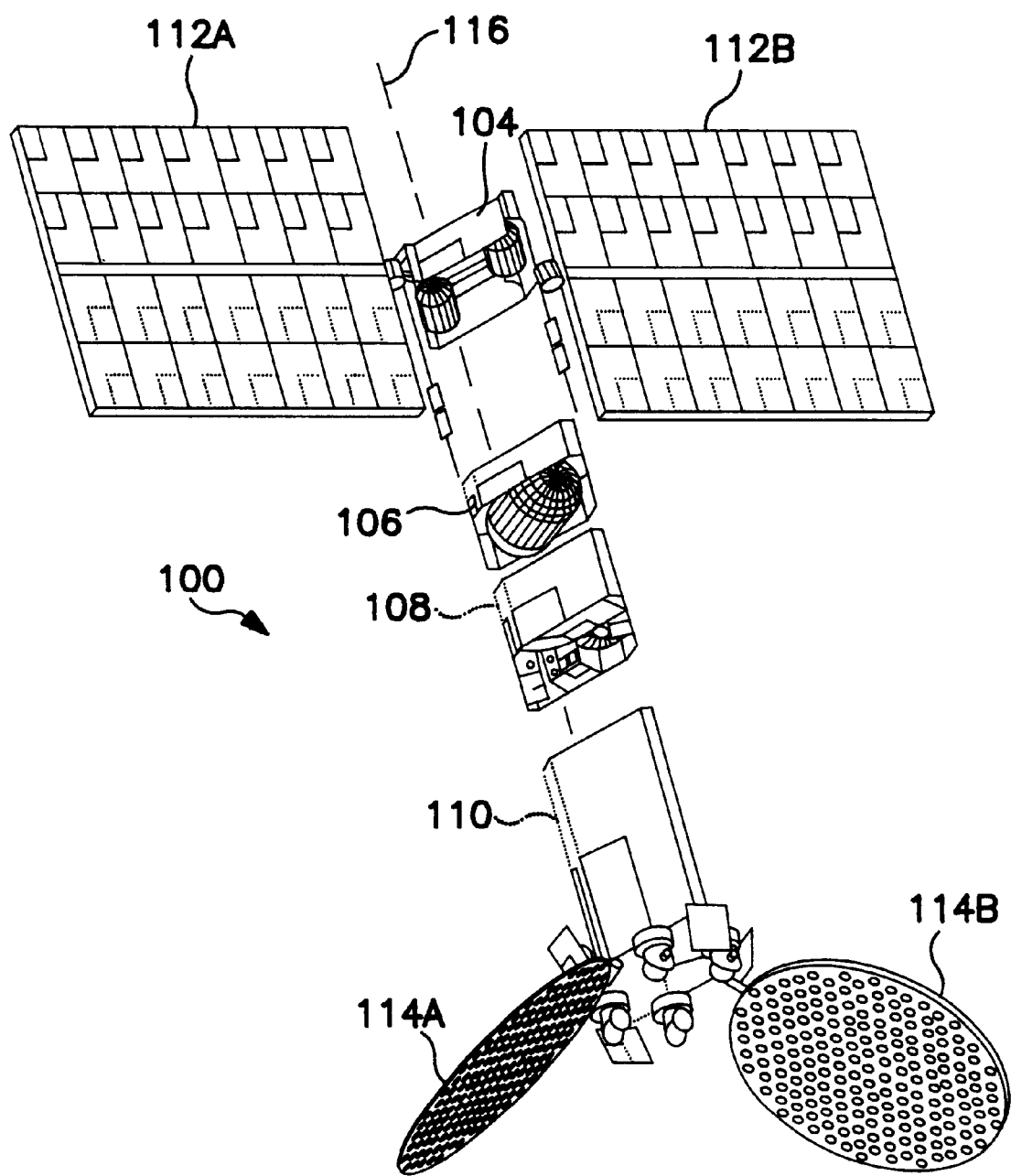
FIG. 2 is an exploded view of a spacecraft according to a preferred embodiment of the present invention.

FIG. 1 is a perspective view of a spacecraft 100 in an on-orbit configuration according to a preferred embodiment of the present invention. FIG. 2 is an exploded view of spacecraft 100. The spacecraft is intended to fulfill multiple missions and is capable of horizontal, vertical, or off-axis flight orientations. The spacecraft missions can include remote sensing requiring stable pointing and telecommunications requiring varying degrees of stability.

Spacecraft 100 comprises a body 102, solar panels 112, and mission antennas 114. Body 102 includes a plurality of modules 104, 106, 108, and 110 connected together along the longitudinal axis 116 of spacecraft 100, as will be described in detail below. Each module has a cross section substantially like a parallelogram. Further, each module is devoted to a specific function. For example, referring to FIG. 1, module 104 is devoted to electrical power, module 106 is devoted to propulsion, module 110 is devoted to processing, and module 110 is a payload module.

Of course, most spacecraft systems include external elements that cannot be included within a module. For example, an exemplary electrical power system includes solar arrays, solar array deployment mechanisms, and solar array sun tracking mechanisms that must be attached externally to the spacecraft body; however, according to a preferred embodiment, internal elements, such as the batteries are included within the respective functional module. In a preferred embodiment, electrical power module 104 is placed at one end of the spacecraft to be as far from the payload as possible so solar arrays 112A, B do not interfere with payload fields of view. An exemplary electrical power module 104 occupies approximately 12 inches of axial length of spacecraft body 102. This arrangement also allows module 104 to perform the functions of the launch vehicle interface.

In a preferred embodiment, processor module 108 is located adjacent to payload module 110, and serves as the payload interface. An exemplary onboard processing module 108 can include software, processors, and memory and occupies approximately 20 inches of axial length of spacecraft body 102.

Also in a preferred embodiment, propulsion module 106 is located between processor module 108 and the electrical power module 104. An exemplary propulsion module 106 includes fuel, pressurant, and tanks and occupies approximately 28 inches of axial length of spacecraft body 102; thrusters and associated plumbing are generally mounted externally.

The overall length of spacecraft 100 is limited by factors including mission antenna area, launch vehicle fairing height and contour, and solar array area and stowing. For example, the available height in a Delta II ten foot fairing is approximately 145 inches and, allowing 45 inches for payload considerations, leaves 100 inches for the bus length.

A key advantage of this functionally modular design is its flexibility. Functional modules can be added to the spacecraft or removed from the spacecraft with ease. For example, other modules can be added to the spacecraft of FIG. 1 to handle functions such as attitude control, attitude knowledge, and communication. An exemplary attitude control module includes momentum/reaction wheels, magnetometers, and torque rods. An exemplary attitude knowledge subsystem includes GPS receivers, star trackers, horizon sensors, and sun sensors. An exemplary communication module can include antennas, signal generators, onboard storage, and encoders and decoders.

Another key advantage of the functionally modular design of the present invention is that the functional modules can be assembled in different arrangements based on mission considerations. For example, if a mission requires high pointing accuracy, the attitude knowledge and control modules can be located near the center of mass of the spacecraft. On the other hand, if a mission requires rapid reorientation of the spacecraft, the attitude knowledge and control modules can be located away from the center of mass. Other considerations include mass changes within modules. For example, as propellant used, the mass of the propulsion module will change. This consideration is used to determine the placement of the propulsion module.

Yet another key advantage of the functionally modular design of the resent invention is that it permits parallel and distributed manufacturing. This is especially advantageous when a large number of spacecraft must be produced in a short period of time. In parallel manufacturing, a separate assembly line can be created for each different type of module. During integration, when the spacecraft modules are connected together, if one module fails, it can be replaced with an identical module rather than trying to debug the entire spacecraft system.

Another advantage is that it is easy to reconfigure a manufacturing facility to make different types of spacecraft for different missions by retaining the manufacturing lines for modules that are common to the new spacecraft, such as propulsion and power, while merely adding new lines for new modules that are required by the mission, such as a new payload module.

This approach also permits distributed manufacturing, where different modules are produced at different facilities. Under this approach, a contractor can allocate the manufacture of different modules to different subcontractors.

In a preferred embodiment, the module structure is made from graphite fiber reinforced epoxy plastic or graphite composite, although other materials can be used without departing from the scope of the present invention.

Shape

Figure 3:
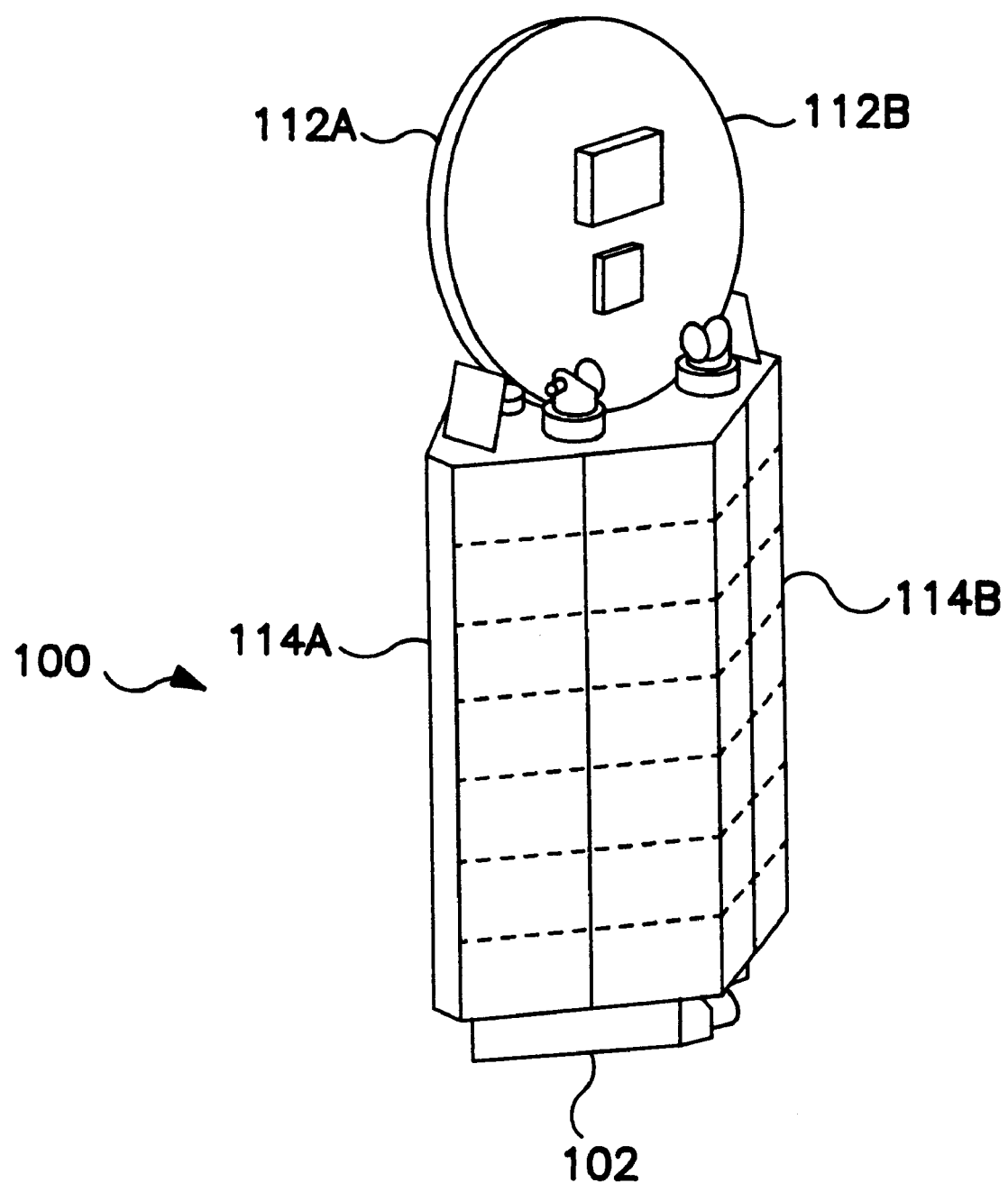
FIG. 3 is a perspective view of a spacecraft in a stowed configuration according to a preferred embodiment of the present invention.

FIG. 3 is a perspective view of spacecraft 100 in a stowed configuration. In this configuration, mission antennas 114A,B have been brought together and solar panels 112A,B are folded around the body of the spacecraft. Spacecraft 100 is placed in this stowed configuration for mounting within a launch vehicle for deployment to orbit.

Figure 4:
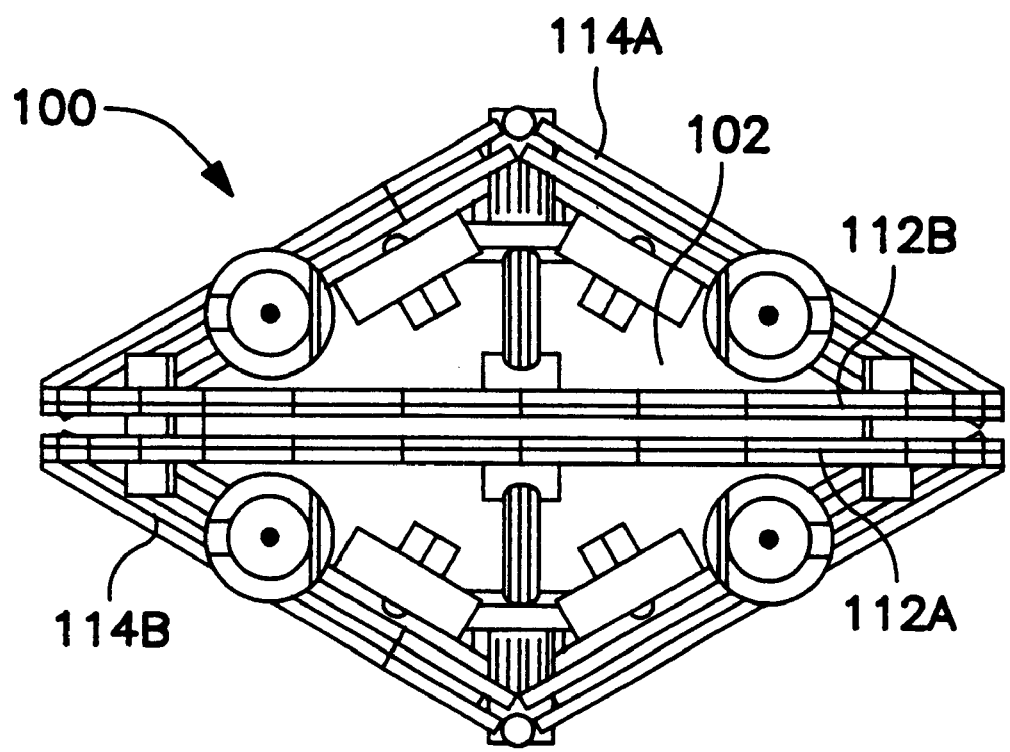
FIG. 4 is an end view of a spacecraft in a stowed configuration according to a preferred embodiment of the present invention.

FIG. 4 is an end view of spacecraft 100 in the stowed configuration. In this view, body 102 is visible, as are mission antennas 114A,B and solar arrays 112A,B. From this perspective, sighting along the longitudinal axis of spacecraft 100, it is clear that the cross section of the body 102 of spacecraft 100 is a parallelogram. In one embodiment, each edge of the parallelogram is approximately 33 inches, and an internal angle of the parallelogram is 60 degrees.

Figure 5:
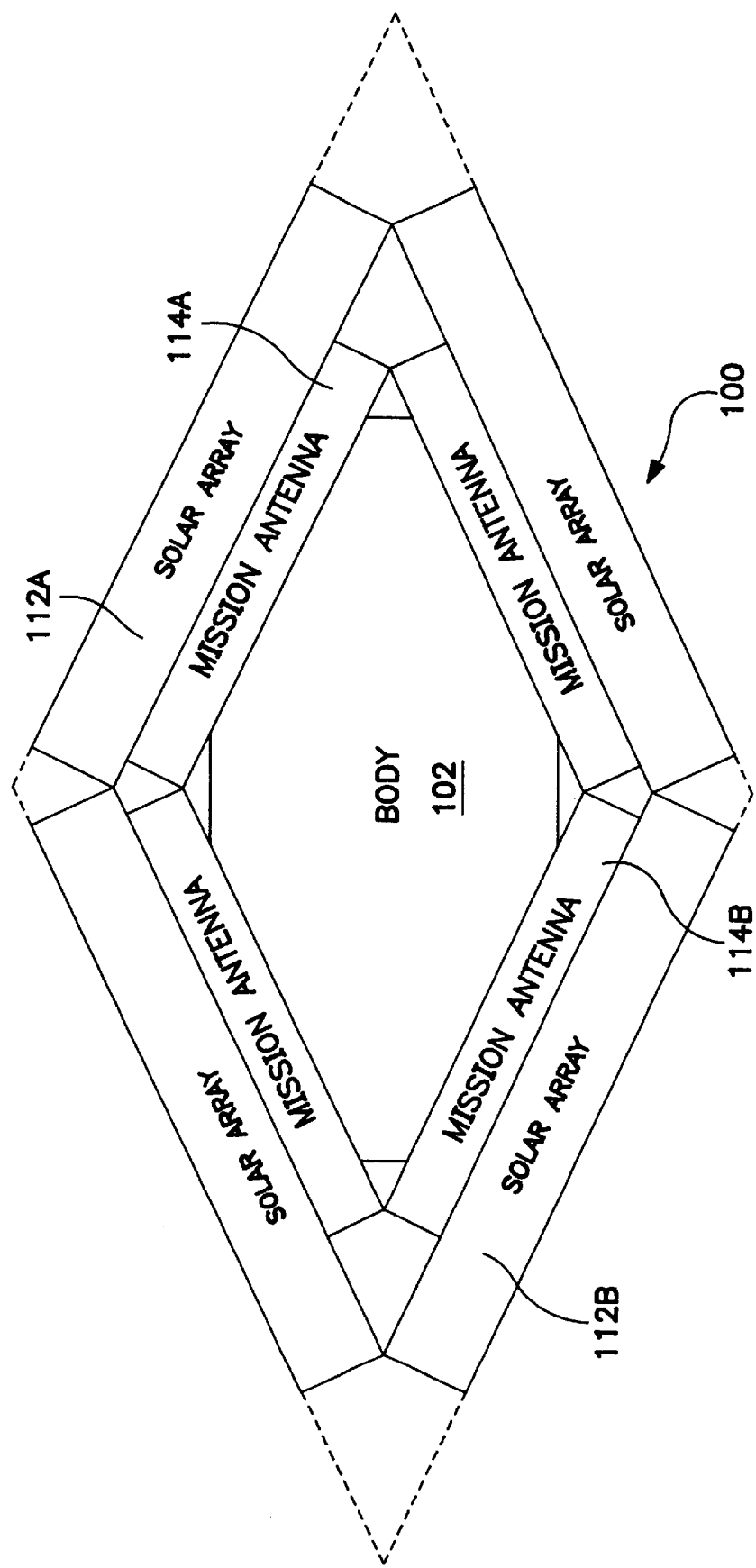
FIGS. 5 and 6 depict two alternative stowed configurations of a spacecraft according to a preferred embodiment of the present invention.
Figure 6:
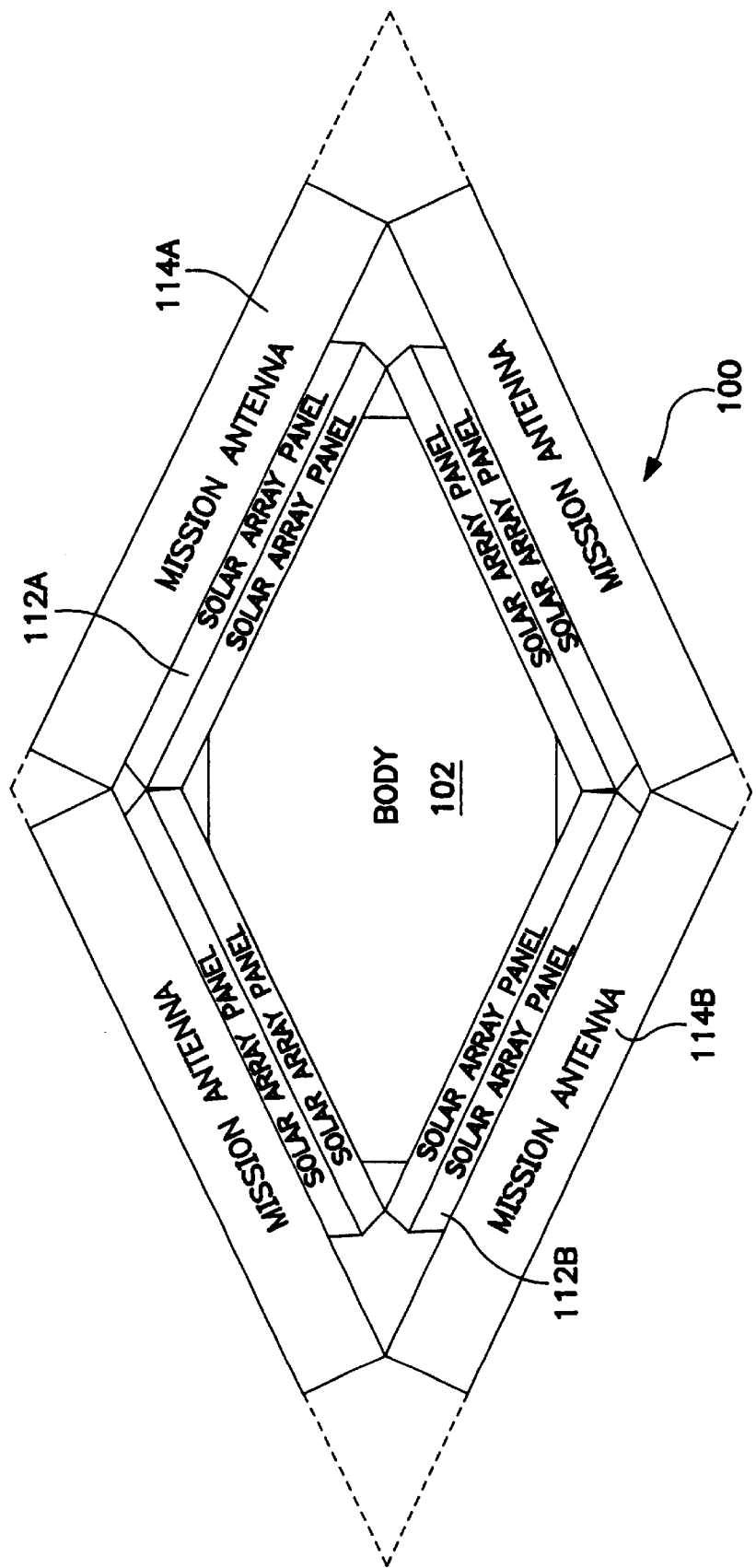
Figure 7B:
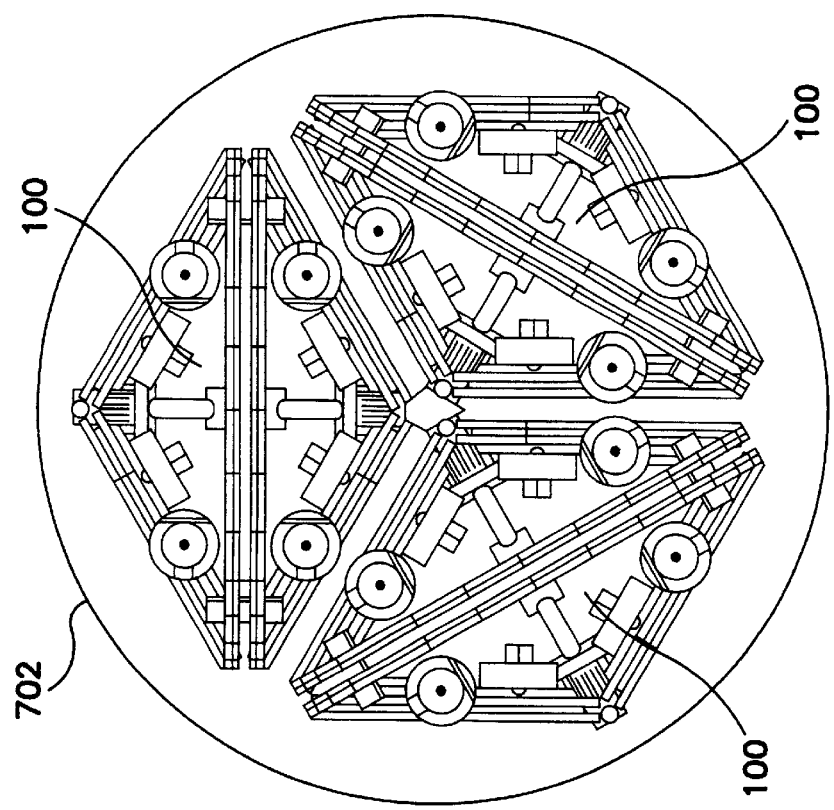
Figure 7A:
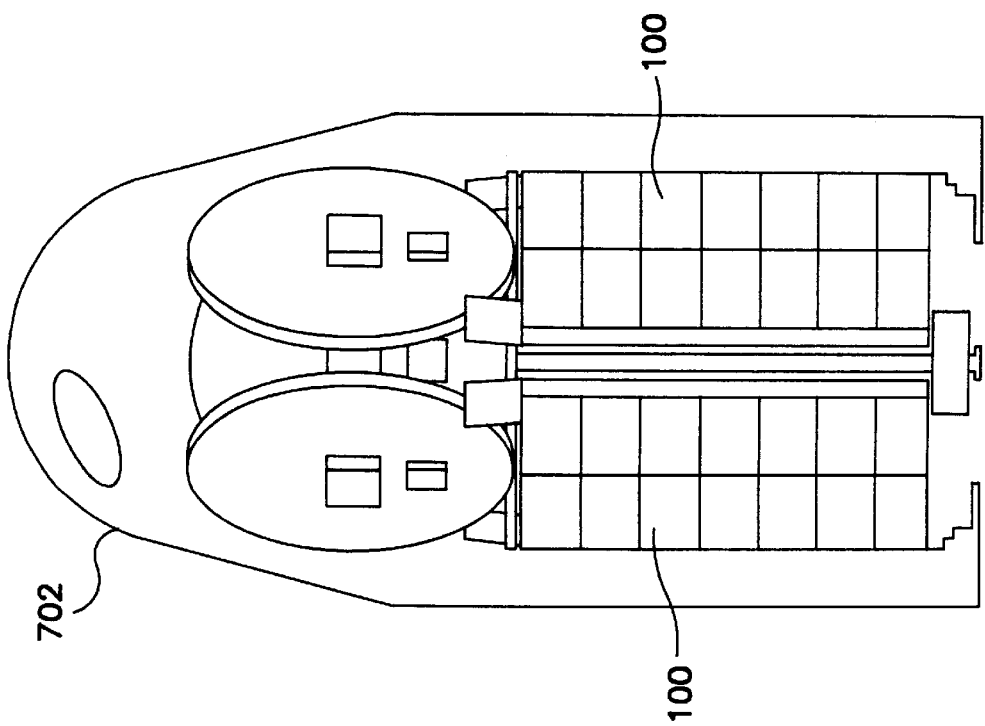

FIGS. 5 and 6 depict two alternative stowed configurations. In FIG. 5, mission antennas 114 have been folded against body 102, with solar arrays 112 folded against mission antennas 114. In FIG. 6, solar arrays 112 have been folded against body 102, with mission antennas 114 folded against solar arrays 112. Other stowed configurations are possible within the scope of the present invention.

The parallelogram cross sectional shape was chosen based on several factors, including launch vehicle packing and payload fairing diameter, mission antenna stowing, solar array stowing, and structural stiffness. A key consideration was maximizing the number of spacecraft that can be mounted in a single launch vehicle, considering several available launch vehicles.

FIGS. 7–10 show spacecraft 100 stowed and mounted within several commercially-available launch vehicles. FIGS. 7A and 7B show three spacecraft 100 mounted within a Delta II fairing 702, which has a cylindrical payload envelope 108 inches in diameter and 179 inches high.

Figure 8B:
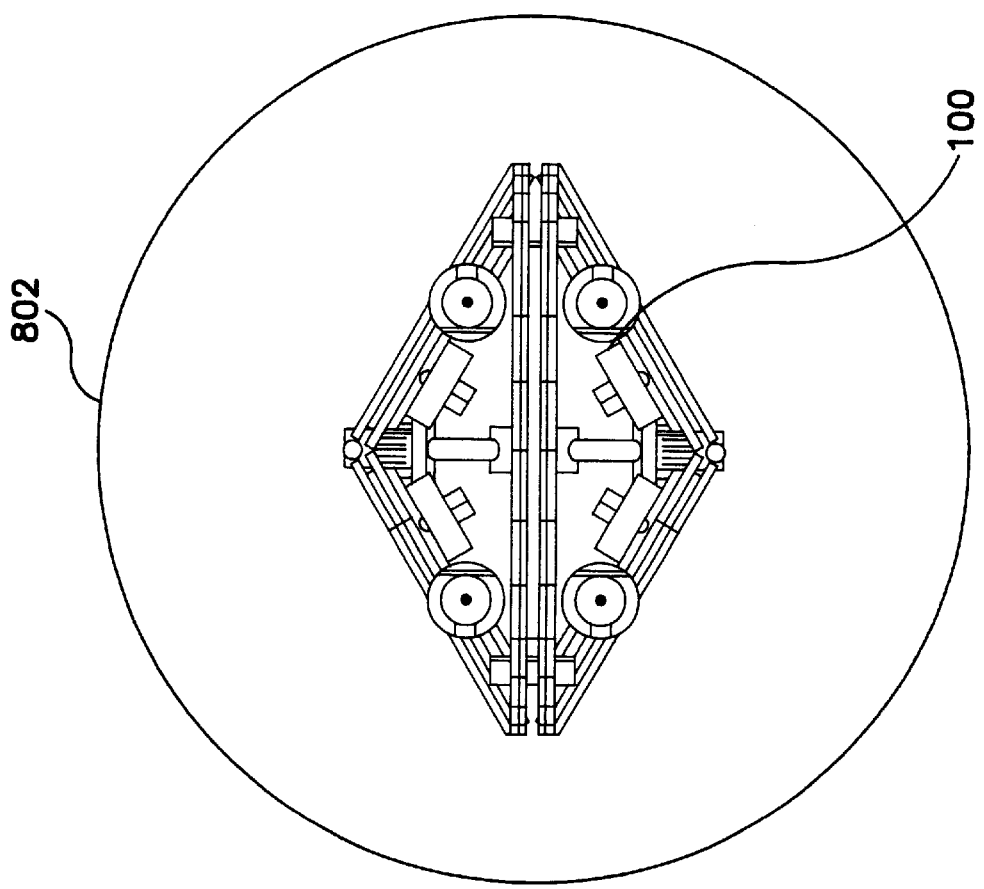
Figure 8A:
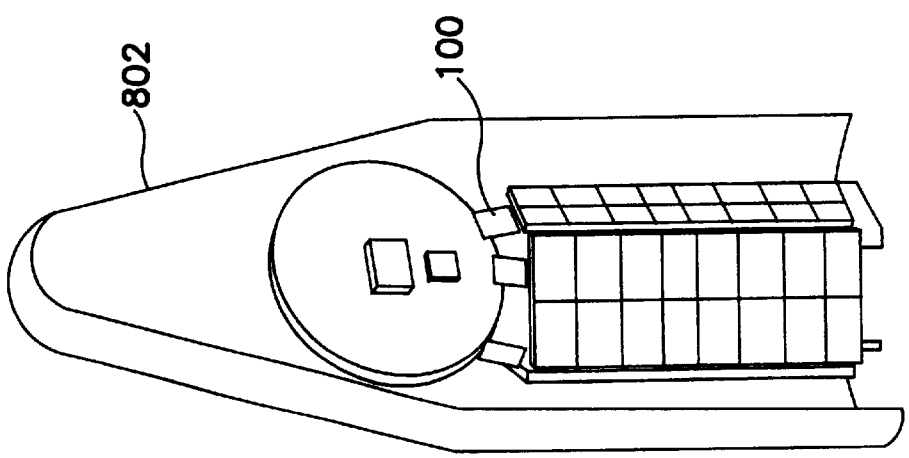

FIGS. 8A and 8B show a single spacecraft 100 mounted within an Athena II 120" Fairing 802.

FIGS. 9A and 9B show four spacecraft 100 mounted within a Proton Large Payload Fairing 902, which has a cylindrical payload envelope 149.76 inches in diameter and 136.73 inches high.

Figure 10B:
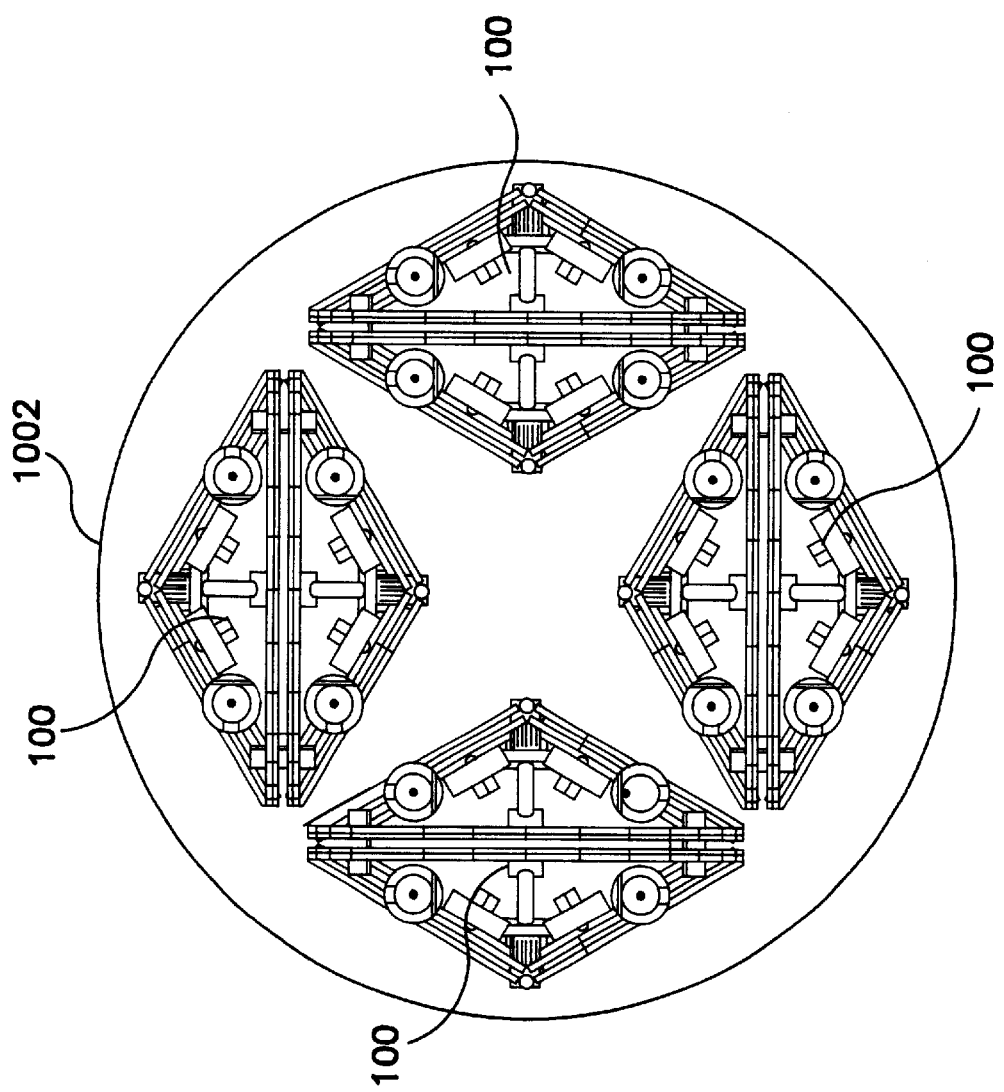
Figure 10A:
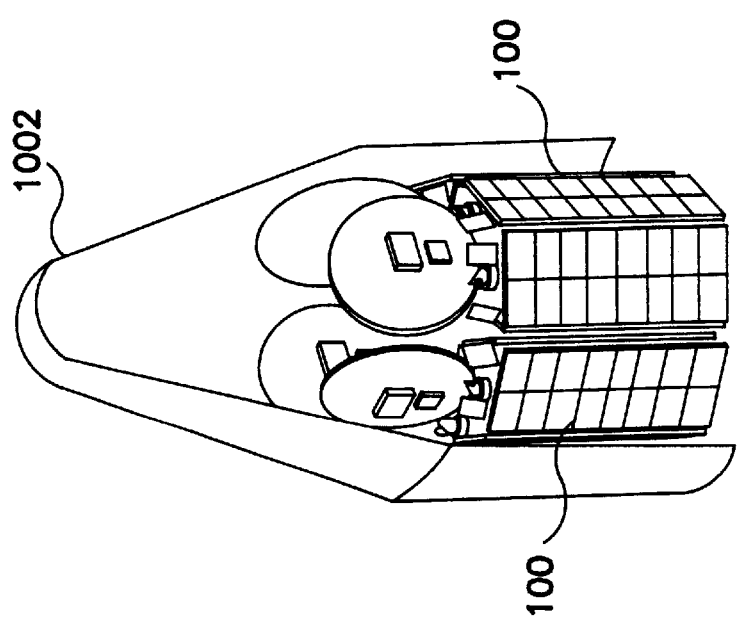

FIGS. 10A and 10B show four spacecraft 100 mounted within an Atlas Large Payload Fairing 1002, which has a cylindrical payload envelope 143.7 inches in diameter and 144.5 inches high.

Channels

In a preferred embodiment, the modules comprising spacecraft 100 are joined together by channels and clips. In a preferred embodiment, the cross-sectional shape of spacecraft body 102 is not a perfect parallelogram. Instead, each corner of the parallelogram is blunted to form a flat. Each flat is connected to a channel that extends longitudinally the length of spacecraft body 102. Of course, other types of mounting surfaces could be provided for each module, as would be apparent to one skilled in the relevant arts. Referring to FIG. 1, two channels 122, 124 are shown.

Figure 11:
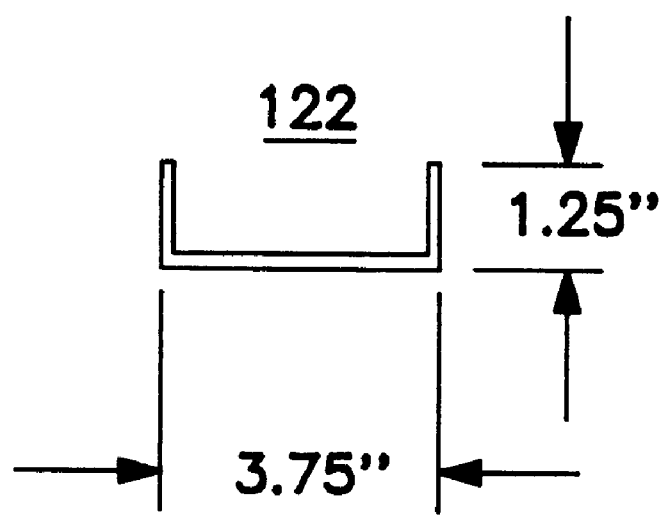
FIGS. 11 and 12 depict cross-sectional views of structural channels used in a spacecraft according to a preferred embodiment of the present invention.
Figure 12:
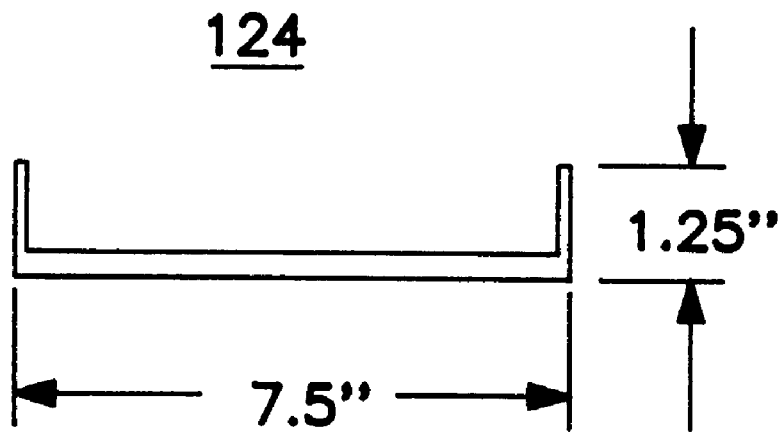

FIGS. 11 and 12 depict cross-sectional views of channels 122 and 124. In a preferred embodiment, one pair of opposing channels 122 is wider than the other pair 124. Wider channels 122 allow for the mounting of larger external elements, such as solar arrays 112 and mission antennas 114, than do the narrower channels 124.

Channels 122, 124 have several advantages. First, the channels increase the structural stiffness of spacecraft 100, a desirable characteristic. Second, the channels provide a means for mounting external elements, such as antennas. The channels also accommodate adjustable brackets for adding external elements, such as thrusters, that require high positioning accuracy that can vary for each mission. Finally, the channels have an open c-shape that permits interconnections, such as electrical cables and propellant tubing, between modules and to external elements.

Channels 122, 124 can be fabricated from many materials. In a preferred embodiment, they are made from aluminum.

Clips

Figure 13:
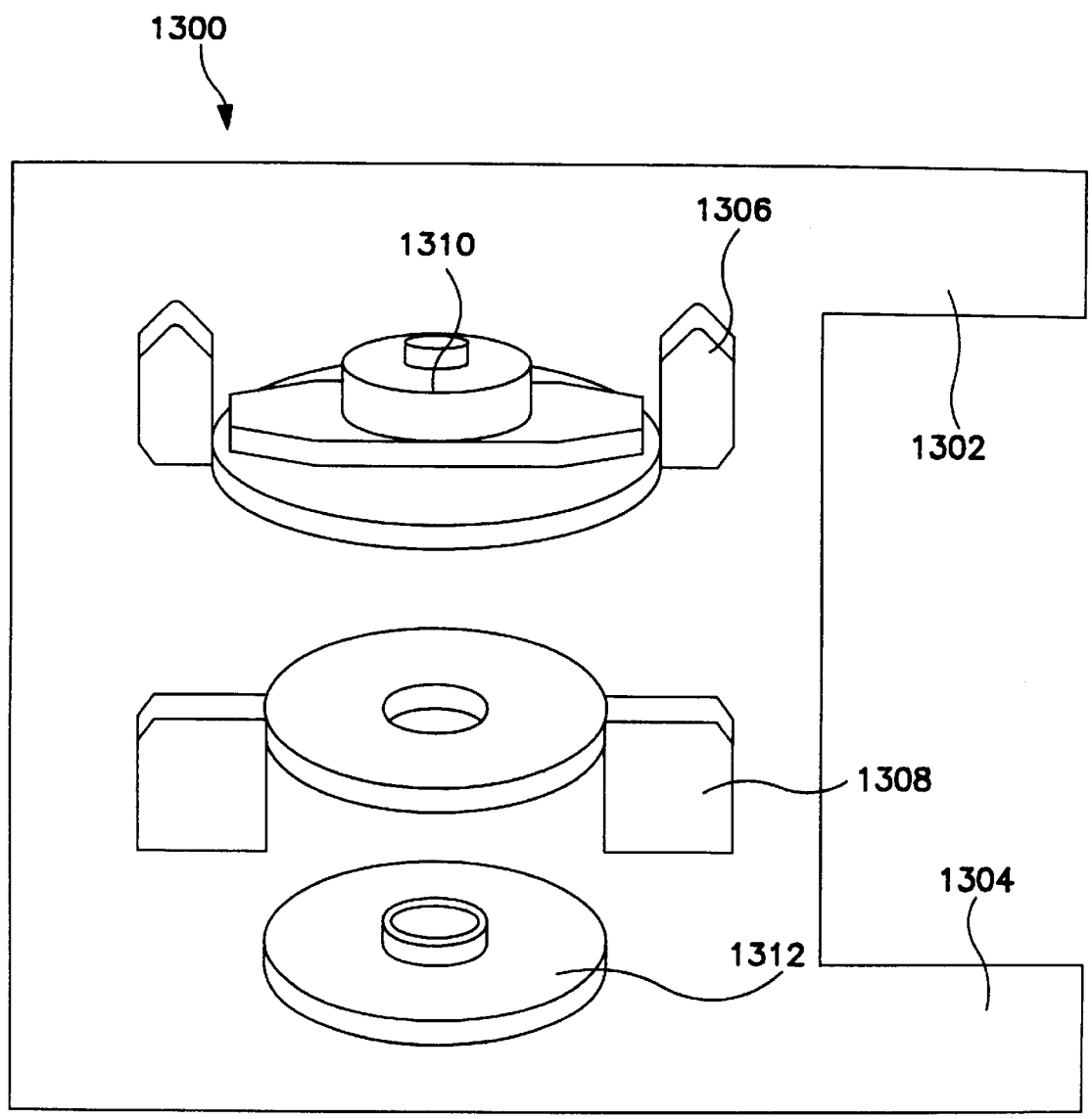
FIG. 13 is a perspective view of a clip connecting a structural panel of one spacecraft module to a structural panel of another spacecraft module according to a preferred embodiment of the present invention.

In a preferred embodiment, each module is structurally connected to its neighbor at the perimeter by a plurality of structural clips 1300. FIG. 13 is a perspective view of a clip 1300 connecting a structural panel 1302 of one module to a structural panel 1304 of another module. Clip 1300 includes a c-clip 1306, a pocket clip 1308, a nut plate 1310, a necked washer 1312, and a bolt (not shown).

Figure 14:
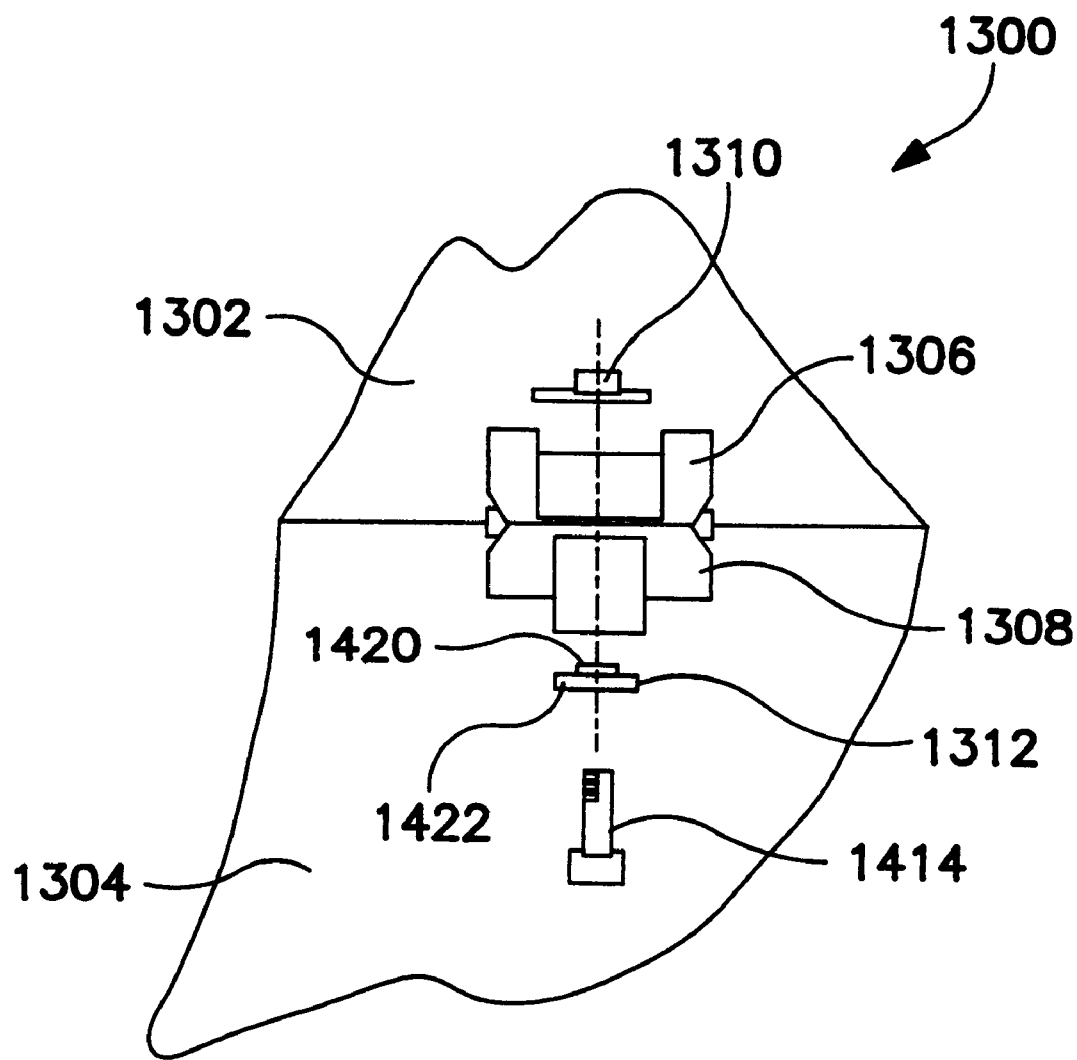
FIG. 14 is an exploded view corresponding to FIG. 13.

FIG. 14 is an exploded view corresponding to FIG. 13, showing bolt 1414 that joins clip 1300 together. During assembly, nut plate 1310 is riveted to c-clip 1306, which is then bonded to panel 1302 by, for example, an adhesive. Pocket clip 1308 is similarly bonded to panel 1304. Bolt 1414 is then placed through necked washer 1312, pocket clip 1308, c-clip 1306, and is seated within nut plate 1310.

In a preferred embodiment, necked washer 1312 includes a washer body 1422 and a washer neck 1420. Washer neck 1420 is sized such that it extends within the hole in pocket clip 1308 and has some room to move laterally. This allows the pocket clip 1308 and c-clip 1306 to be engaged even when they are slightly offset laterally, facilitating easy assembly.

During assembly, all of the clips connecting two modules are assembled and aligned. Then, bolts 1414 on alternate clips 1300 are tightened. Adhesive is applied to secure the necked washers 1412 to the pocket clips 1308 on the remaining clips 1300 and the bolts 1414 on those clips are tightened. Once the adhesive has cured, the bolts 1414 for the clips 1300 without adhesive are loosened and the process is repeated. The result is a simple manufacturing process that produces a rigid spacecraft in a fastener bodybound condition.

Similar structural clips have a heritage on the Lockheed A2100 spacecraft bus. In a preferred embodiment, the clips are formed by machining an aluminum extrusion, although other processes can be used, as would be apparent to one skilled in the relevant arts.

The pocket-mounted clip design described above provides a method for connecting flat structural panels together without using traditional flanges or splice plates with nuts or bolts at the joints. Historically, mechanical flat panel connections were designed with either a protruding flange at the joint edge, which uses traditional nuts and bolts for holding the structure together or splice plates on either side of the joint, which require nuts and bolts to complete the panel connection. Spacecraft or other structures requiring smooth panel joints and requiring dismantling cannot use these traditional methods for joining. The clips described above provide a method to join flat panels together without protrusions on either side and allow for dismantling of the panels conveniently. The pocket mounted clips of the present invention can be sized for any panel thickness. This unique design concept allows the clips to carry the normal tension and compression loads but also to carry shear loads in a tight fitting joint without relying on friction. Other advantages of the clips include low profile and light weight.

Conclusion

While various embodiments of the present invention have been described above, it should be understood that they have been presented by way of example, and not limitation. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. A spacecraft comprising:

a plurality of modules joined to one another along an axis of the spacecraft;

wherein each module is devoted to a particular function of the spacecraft, the functions including power, processing, and propulsion;

wherein all of the modules have the same cross-sectional size and geometry to accommodate interchangeable stacking sequences, the geometry being approximately a parallelogram in a plane normal to the axis of the spacecraft.

2. The spacecraft of claim 1, wherein one internal angle of the parallelogram is approximately sixty degrees.

3. The spacecraft of claim 2, wherein an edge of the parallelogram is approximately 33 inches.

4. The spacecraft of claim 1, wherein each corner of the parallelogram includes a mounting surface.

5. The spacecraft of claim 4, further comprising:

a plurality of longitudinal members, each coupled to one of the mounting surfaces of each module.

6. The spacecraft of claim 5, wherein one of the members is formed into a channel, thereby improving the structural stiffness of the spacecraft and providing an interconnection path between the modules.

7. The spacecraft of claim 1, further comprising:

a plurality of clips, each coupled between adjacent modules thereby joining the adjacent modules.

8. The spacecraft of claim 1, further comprising:

a solar array foldable into a plurality of sections, each of the sections positionable against a side of the spacecraft corresponding to a side of the parallelogram.

9. The spacecraft of claim 1, further comprising:

a mission antenna foldable into a plurality of sections, each of the sections positionable against a side of the spacecraft corresponding to a side of the parallelogram.

* * * * *